US009634917B2

(12) United States Patent
Theogaraj et al.

(10) Patent No.: US 9,634,917 B2
(45) Date of Patent: Apr. 25, 2017

(54) METHOD AND SYSTEM FOR DETECTING USE OF WRONG INTERNET PROTOCOL ADDRESS

(71) Applicant: Aruba Networks, Inc., Sunnyvale, CA (US)

(72) Inventors: Isaac Theogaraj, Bangalore (IN); Rajalakshmi Manoharan, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 316 days.

(21) Appl. No.: 14/517,279

(22) Filed: Oct. 17, 2014

(65) Prior Publication Data

US 2016/0112286 A1 Apr. 21, 2016

(51) Int. Cl.
*G06F 15/173* (2006.01)
*H04L 12/26* (2006.01)
*H04L 29/12* (2006.01)
*H04L 12/46* (2006.01)

(52) U.S. Cl.
CPC ........ *H04L 43/065* (2013.01); *H04L 12/4641* (2013.01); *H04L 61/2015* (2013.01); *H04L 61/2092* (2013.01); *H04L 61/6068* (2013.01)

(58) Field of Classification Search
CPC ............. H04L 61/2015; H04L 61/2092; H04L 61/6068; H04L 12/4641; H04L 43/065
See application file for complete search history.

(56) References Cited

U.S. PATENT DOCUMENTS

| 2003/0142642 | A1* | 7/2003 | Agrawal | H04L 29/12311 370/328 |
| 2004/0059909 | A1* | 3/2004 | Le Pennec | H04L 63/1466 713/153 |
| 2006/0224704 | A1* | 10/2006 | Parikh | H04L 29/12264 709/220 |
| 2007/0104200 | A1* | 5/2007 | Lai | H04L 45/00 370/392 |
| 2009/0019181 | A1* | 1/2009 | Fang | H04L 29/12066 709/245 |
| 2011/0023093 | A1* | 1/2011 | Small | H04L 29/12283 726/4 |
| 2014/0173124 | A1* | 6/2014 | Velayudhapillai | H04L 61/2046 709/228 |

* cited by examiner

*Primary Examiner* — Mohamed Wasel
(74) *Attorney, Agent, or Firm* — Brooks, Cameron & Huebsch, PLLC

(57) ABSTRACT

An example embodiment includes a method and a network device for detecting use of wrong IP addresses by wireless client devices. Specifically, the network device matins a range of valid IP addresses for a particular IP subnet. Also, the network device receives a message from a wireless client device by an access point on the particular IP subnet. The network device then determines a source IP address in the message received on the particular IP subnet. Further, the network device determines that the source IP address does not match the range of valid IP addresses for the particular IP subnet. Responsive at least to determining that the source IP address does not match the range of valid IP addresses for the particular IP subnet, the network device transmits at least one message that causes the wireless client device to request a new IP address.

20 Claims, 6 Drawing Sheets

METHOD AND SYSTEM FOR DETECTING USE OF WRONG INTERNET PROTOCOL ADDRESS

FIELD

Embodiments of the present disclosure relate to Dynamic Host Configuration Protocol (DHCP) wireless client address managements. In particular, embodiments of the present disclosure describe a method and network device for detecting use of wrong Internet Protocol (IP) addresses.

BACKGROUND

In some network deployments, when a wireless client device roams from a current access point (AP) on a current virtual local area network (VLAN) to a new AP on a new VLAN, the wireless client device may fail to obtain a new dynamic host configuration protocol (DHCP) address on the new VLAN due to temporary network issues. As a result, the wireless client device will keep using the wrong Internet Protocol (IP) address that was previously assigned to the wireless client device on the old VLAN.

Wireless client devices often encounter DHCP issues intermittently causing failure to obtain an IP address corresponding to the new VLAN. If a client device tries to renew the IP address at a later time, the client might obtain a valid IP address. There may be a few reasons for the client device's initial failure to obtain a valid DHCP IP address. First, a temporary glitch may have occurred in the network causing a packet loss. For example, in a classroom when all students come for a class and their client devices associate with the network during the same period of time, a few of the client devices might encounter packet losses due to temporary network congestion. Those few client devices may fall back to use automatic IP addresses. Second, a temporary DHCP server failure may have occurred. Third, the DHCP lease may be temporarily unavailable.

Some client devices have mechanisms to retransmit network requests for DHCP IP address assignment in the event of a failure. For example, a Windows® client device will typically retransmit DHCP requests for three times. Specifically, the client device may send the first retry message after 4 seconds, the next retry message after 8 seconds, and the last retry message after 16 seconds. This mechanism leads to roughly 28 seconds before falling to a self-assigned automatic IP address. This process can be repeated after 30 seconds and/or every 6 minutes or so thereafter. Nevertheless, there is no existing mechanism that allows the client device to re-initiate the DHCP IP address requesting process faster upon an initial failure to obtain a valid DHCP IP address by the client device.

Therefore, client devices may benefit from an intervening mechanism to help them receive valid DHCP IP addresses after they roam to new VLANs in cases of an initial failed attempt. This will improve overall network customer experience.

DETAILED DESCRIPTION

In the following description, several specific details are presented to provide a thorough understanding. While the context of the disclosure is directed to DHCP client management in wireless local area networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

Overview

Embodiments of the present disclosure relate to Dynamic Host Configuration Protocol (DHCP) wireless client address managements. In particular, embodiments of the present disclosure describe a method and network device for detecting use of wrong IP addresses by wireless client devices.

With the solution provided herein, a network device maintains a range of valid IP addresses for a particular IP subnet. Also, the network device receives a message from a wireless client device by an access point on the particular IP subnet. The network device then determines a source IP address in the message received on the particular IP subnet. Further, the network device determines that the source IP address does not match the range of valid IP addresses for the particular IP subnet. Responsive at least to determining that the source IP address does not match the range of valid IP addresses for the particular IP subnet, the network device transmits at least one message that causes the wireless client device to request a new IP address. Specifically, the network device maintains the range of valid IP addresses by snooping a DHCP message transmitted to another wireless client device on the particular IP subnet. Based on the DHCP message, the network device can identify the range of valid IP addresses on the particular IP subnet.

Network Computing Environment

Figure 1:
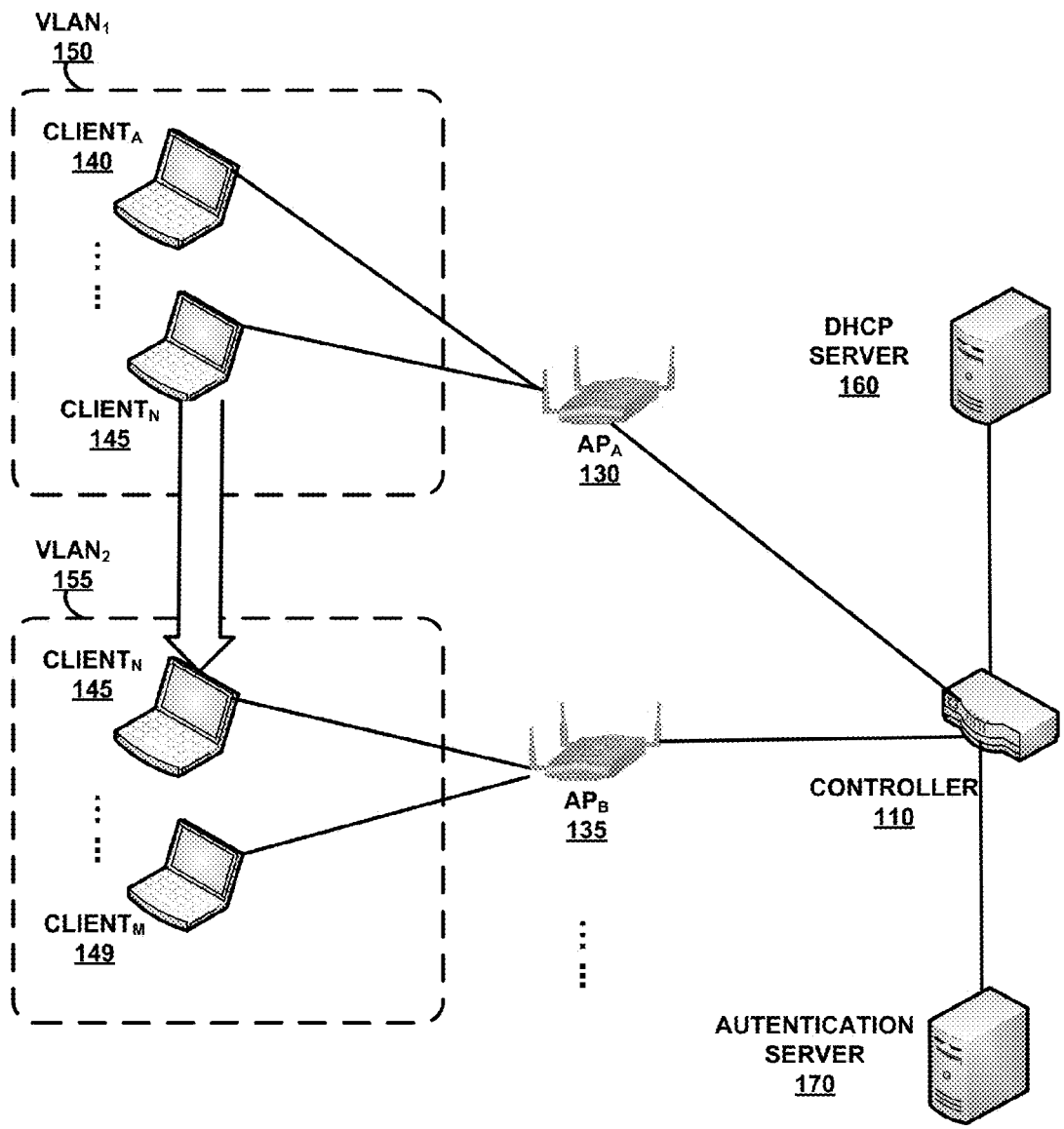
FIG. 1 shows an exemplary network environment according to embodiments of the present disclosure.

FIG. 1 shows an exemplary network environment according to embodiments of the present disclosure. Specifically, FIG. 1 illustrates a network that includes at least a DHCP server 160, an authentication server 170, a network controller 110, a number of access points (APs) (such as, $AP_A$ 130 and $AP_B$ 135), and a plurality of client devices, such as $Client_A$ 140, . . . , $Client_N$ 145, . . . , $Client_M$ 149, etc.

Network controller 110 generally refers to a controlling device that manages other network devices such as wireless access points. Network controller 110 may handle automatic adjustments to radio frequency power, wireless channels, wireless authentication, and/or security. Furthermore, network controller 110 can be combined to form a wireless mobility group to allow inter-controller roaming. Network controller 110 can be part of a mobility domain to allow clients access throughout large or regional enterprise facility locations. This saves the clients time and administrators overhead because it can automatically re-associate or re-authenticate.

Access points, e.g., $AP_A$ 130 and $AP_B$ 135, generally refer to a set of wireless network devices that allow wireless client devices to connect to a wired network using IEEE 802.11 or related standards. The APs usually connect to a router via a wired network, but can also be an integral component of the router itself.

DHCP server 160 receives requests for IP addresses from client devices, and configures a plurality of networking parameters (including an IP address) automatically for the client devices, thereby reducing the need for a network administrator or a user to configure these settings manually.

Dynamic Host Configuration Protocol (DHCP) is a standardized networking protocol used on Internet Protocol (IP) networks for dynamically distributing network configuration parameters, such as IP addresses for interfaces and services. A typical DHCP handshake communication exchange includes one or more of the following operations: (1) DHCP DISCOVER; (2) DHCP OFFER; (3) DHCP REQUEST; and (4) DHCP ACK.

First, a client device (e.g., $Client_A$ 140) can broadcast a DHCP DISCOVER message on a sub-network using the destination address 255.255.255.255 or the specific subnet broadcast address. A DHCP client device (e.g., $Client_A$ 140) may also request to renew its last-known IP address assigned by DHCP server 160.

Next, when DHCP server 160 receives a DHCP DISCOVER message from a client device (e.g., $Client_A$ 140), which is an IP address lease request, DHCP server 160 reserves an IP address for the client device (e.g., $Client_A$ 140), and makes a lease offer by sending a DHCP OFFER message to the client device (e.g., $Client_A$ 140).

DHCP OFFER message includes at least the client device's identifier (e.g., $Client_A$ 140's Media Access Control (MAC) address), the IP address that DHCP server 160 is offering, the subnet mask, the lease duration, the IP address of DHCP server 160 making the offer, etc.

In response to the DHCP OFFER message, the client device (e.g., $Client_A$ 140) replies with a DHCP REQUEST message, a broadcast message to the server requesting the offered address. Note that, a client device (e.g., $Client_A$ 140) can receive DHCP OFFER messages from multiple servers, but the client device (e.g., $Client_A$ 140) will accept only one DHCP OFFER. Based at least on server identifiers in the DHCP REQUEST message, DHCP servers are informed whose offer the client device (e.g., $Client_A$ 140) has accepted.

When DHCP server 160 receives DHCP REQUEST message from the client device (e.g., $Client_A$ 140), DHCP server 160 sends a DHCP ACK message to the client device (e.g., $Client_A$ 140). The DHCP ACK message includes at least the lease duration, and configuration information that the client device might have requested.

In addition, other DHCP operations between the client device (e.g., $Client_A$ 140) and DHCP server 160 may include a DHCP INFORMATION message and a DHCP RELEASE message. A DHCP client device may request more information than what DHCP server 160 sent with the original DHCP OFFER message via DHCP INFORMATION message. The client device (e.g., $Client_A$ 140) may also send a DHCP INFORMATION message to request repeat data for a particular application. Moreover, the client device (e.g., $Client_A$ 140) sends a DHCP RELEASE message to DHCP server 160 to release the DHCP INFORMATION and the client device (e.g., $Client_A$ 140) subsequently deactivates its IP address. Note that, the DHCP protocol does not mandate client devices to send DHCP RELEASE messages. The IP assignment for a DHCP client device will expire after a predetermined period of time if the DHCP client device fails to renew the IP address prior to the expiration time of the IP address.

Authentication server 170 generally refers to a server that provides authentication for users that connect and use a network service. For example, Remote Authentication Dial In User Service (RADIUS) is an exemplary networking protocol that provides centralized Authentication, Authorization, and Accounting (AAA) management for network users.

Specifically, a client device sends an authentication request to gain access to a particular network resource using access credentials. The credentials may be passed to an intermediary network device (e.g., a remote access server or a network controller). The intermediary network device sends an Access Request message to RADIUS server (e.g., Authentication server 170), requesting authorization to grant access via the RADIUS protocol. The Access Request can include access credentials, typically in the form of username and password or security certificate provided by the user. Additionally, the Access Request may include any other information which the network device knows about the user.

Authentication server 170 (e.g., a RADIUS server) then checks that the information is correct using authentication schemes, such as PAP, CHAP or EAP. Authentication server 170 then verifies the user's proof of identification. Depending on the result of verification process, authentication server 170 returns an authentication response. For example, a RADIUS server can return one of three responses to the network device: (1) Access Reject, (2) Access Challenge, or (3) Access Accept. An Access Reject message indicates that the user is unconditionally denied access to all requested network resources. An Access Challenge message requests additional information from the user, such as a secondary password, PIN, token, or card. An Access Accept message grants access to the user.

Each access point serves one or more client devices. For illustration purposes only, assuming that, in FIG. 1, a plurality of client devices, such as $Client_A$ 140, . . . , $Client_N$ 145, initially associate with $AP_A$ 130. Moreover, assuming that when each of the client devices associates with $AP_A$ 130, network controller 110 assigns each client device to $VLAN_1$ 150. Therefore, when a client device, e.g., $Client_N$ 145, sends a DHCP request, $AP_A$ 130 will forward the request to DHCP server 160 based on the corresponding VLAN assignment $VLAN_1$ 150 to $Client_N$ 145.

Next, DHCP server 160 will assign an available IP address to $Client_N$ 145 upon receiving the DHCP request. The available IP address will be selected from an address pool that is reserved for $VLAN_1$ 150 and maintained by DHCP server 160. In some scenarios, a client device (e.g., $Client_N$ 145) may subsequently roam to another VLAN, e.g., $VLAN_2$ 155. The client device (e.g., $Client_N$ 145) will request for a new DHCP IP address from DHCP server 160. However, the client device may not be able to receive a valid DHCP IP address assignment corresponding to $VLAN_2$ 155 from DHCP server 160 due to temporary network issues. As a result, the client device (e.g., $Client_N$ 145) may continue to use the previously assigned IP address corresponding to VLAN$_1$ 150, which is a wrong IP address for VLAN$_2$ 155.

There may be a few reasons for the client device's initial failure to obtain a valid DHCP IP address. First, a temporary glitch may have occurred in the network causing a packet loss. Second, a temporary DHCP server failure may have occurred. Third, the DHCP lease may be temporarily unavailable. If a client device (e.g., Client$_N$ 145) tries to renew the IP address at a later time, the client device (e.g., Client$_N$ 145) might obtain a valid IP address from DHCP server 160.

Use of Wrong IP Address

Figure 2:
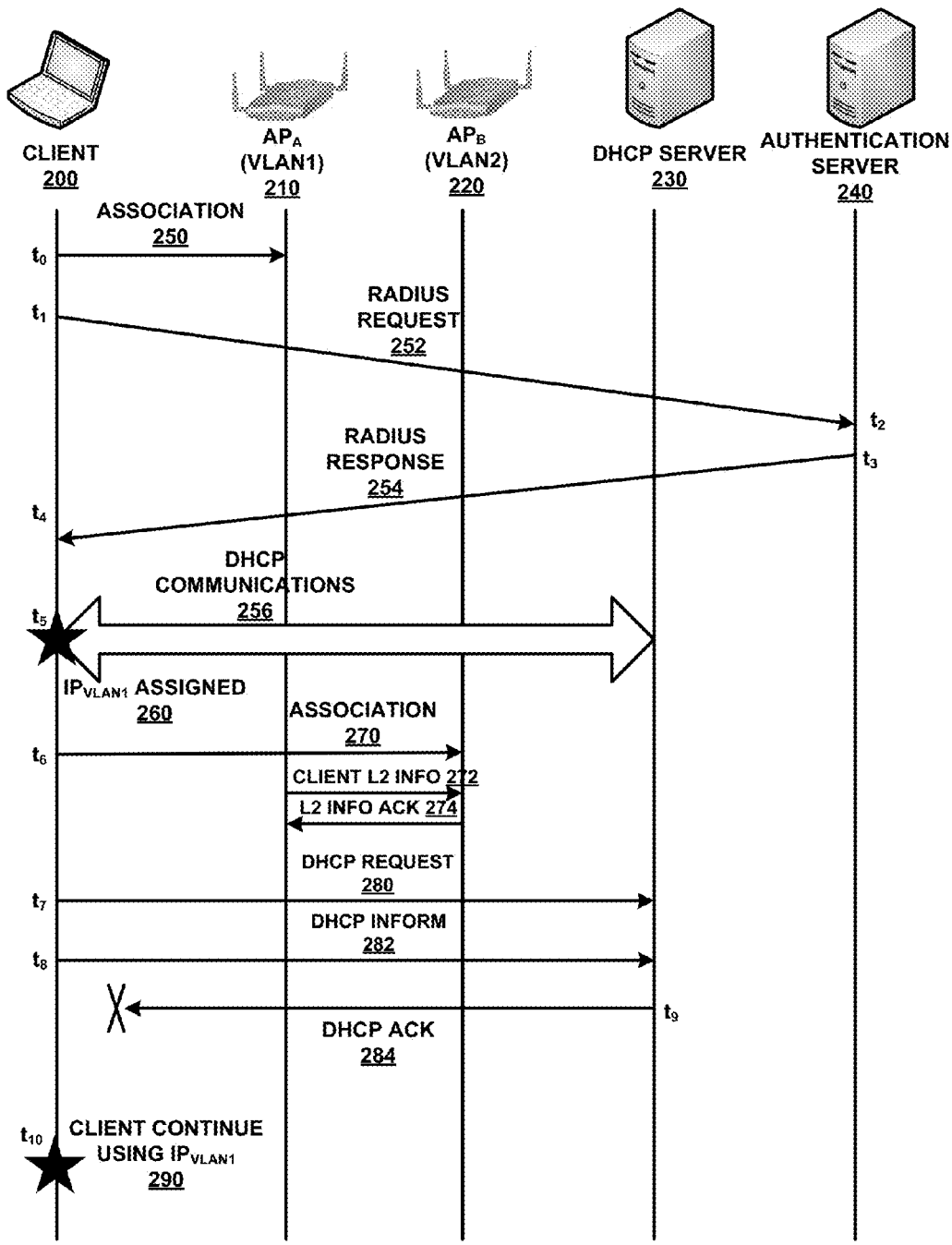
FIG. 2 shows an exemplary sequence diagram illustrating network communication exchanges according to embodiments of the present disclosure.

FIG. 2 shows an exemplary sequence diagram illustrating network communication exchanges resulting in the use of wrong VLAN IP address by a client device according to embodiments of the present disclosure. Specifically, FIG. 2 illustrates a network that includes at least a client device 200, an AP$_A$ 210 corresponding to VLAN$_1$, an AP$_B$ 220 corresponding to VLAN$_2$, a DHCP server 230, and an authentication server 240.

At time point $t_0$, client device 200 initiates an association 250 with an access point (AP$_A$ 210) in a wireless local area network (WLAN). In order to be authenticated by the WLAN, at time point $t_1$, client device 200 sends an authentication request (e.g., RADIUS Request 252), which is received by authentication server 240 at time point $t_2$. Thereafter, at time point $t_3$, authentication server 240 sends an authentication response (e.g., RADIUS Response 254) to client device 200, which is received by client device 200 at time point $t_4$. Here, for illustration purposes only, assuming that RADIUS Response 254 indicates that client device 200 has been granted access to the WLAN.

Next, at time point $t_5$, client device 200 is involved in a series of DHCP communications 256 with DHCP server 230 to obtain a valid DHCP IP address. Assuming that a valid DHCP IP address IP$_{VLAN1}$ is subsequently assigned 260 to client device 200 upon completion of DHCP communications 256. DHCP communications 256 may include, for example, a DHCP DISCOVER message sent by client device 200, a DHCP OFFER message sent by DHCP server 230, a DHCP REQUEST message sent by client device 200, and a DHCP ACK message sent by DHCP server 230. Thereafter, client device 200 will be assigned with a valid DHCP IP address corresponding to VLAN$_1$.

Client device 200 may subsequently roam to a new VLAN. For example, client device 200 may disassociate with AP$_A$ 210, which corresponds to VLAN$_1$, and establish an association 270 with AP$_B$ 220, which corresponds to VLAN$_2$ at time point $t_6$. As a part of the roaming process, AP$_A$ 210 from VLAN$_1$ will transmit Layer-2 information 272 about client device 200 to AP$_B$ 220 in VLAN$_2$. Subsequently, AP$_B$ 220 will transmit an ACK message 274 acknowledging the receipt of Layer-2 information about client device 200.

In some embodiments, if the DHCP lease for the previously assigned IP address expires, client device 200 will need to be assigned with a new IP address. Because the VLAN assignment typically is managed by a network device (e.g., an AP or a network controller), client device 200 may not be aware that it has been assigned to a new VLAN. Thus, as illustrated in FIG. 2, at time point $t_7$ upon expiration of previously assigned IP address, client device 200 will send a DHCP REQUEST message 280 to request to renew the previous IP address. As mentioned above, due to various temporary network issues, client device 200 may not be able to be assigned with a valid DHCP IP address in response to the initial request.

In some embodiments, client device 200 may send a DHCP INFORM message 282 after roaming to the new VLAN$_2$ at time point $t_8$ to indicate that client device 200 will continue using the same IP address. If DHCP server 230 detects a mismatch between client device 200's IP address and the corresponding VLAN assigned to client device 200, DHCP server 230 will send a DHCP ACK message 284 at time point $t_9$ to indicate that client device 200 shall not renew the same IP address and will need to request a new IP address. Nevertheless, DHCP ACK message 284 may not be received by client device 200, for example, due to network packet loss. As a result, at time point $t_{10}$, client device 200, being unaware that it shall request a new IP address, will continue to use the previously assigned wrong IP address 290 that corresponds to VLAN$_1$ instead of VLAN$_2$. Because the APs and/or network controllers typically will not de-authenticate client device 200 during the roaming process, currently there is no existing mechanism that prevents client device 200 from using the wrong IP address.

Detecting Use of Wrong IP Address

In order to detect whether a client device is using an IP address that corresponds to the wrong VLAN, a network device (e.g., a network controller) needs to learn the sub-network IP address range for every VLAN. Specifically, the network device can learn the sub-network IP address range by snooping the DHCP messages transmitted on the network. For example, the network device can snoop a DHCP ACK message or a DHCP OFFER message sent by the DHCP server to other client devices on the same VLAN. The DHCP ACK message and/or DHCP OFFER message will include at least a subnet address (e.g., 10.13.6.0) and a subnet mask (255.255.255.0). Based on the subnet address and the subnet mask retrieved from DHCP OFFER message and/or DHCP ACK message, the network device can derive the IP address range corresponding to the particular VLAN. In this example, because the subnet address assigned to the client device by the DHCP server is 10.13.6.0 and the subnet mask is 255.255.255.0, the network device can derive that the IP address range for the particular VLAN is 10.13.6.0 to 10.13.6.255. Here, it is assumed that the sub-networks are configured by the network controller, and will not be changed very often during network operations.

For each DHCP message detected on a particular VLAN, the network device can compare the source and/or destination IP address of the message with the IP address range corresponding to the particular VLAN. If the source and/or destination IP address is outside the IP address range corresponding to the particular VLAN, the network device can determine that the client device that the message is received from or destined to is using a wrong IP address that corresponds to a different VLAN from the VLAN that the client device is currently assigned to.

Causing Client Device to Request New IP Address

Figure 3:
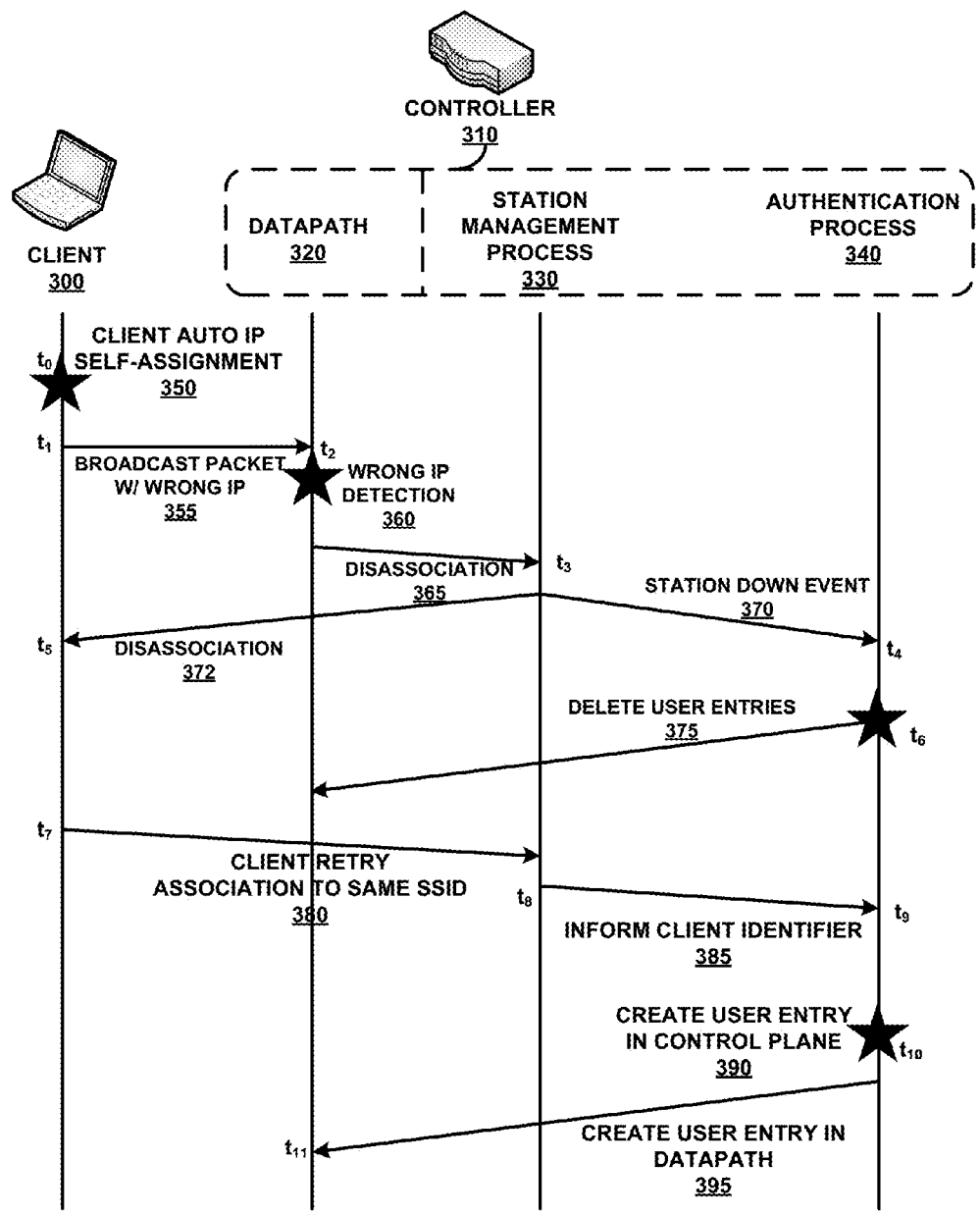
FIG. 3 shows an exemplary sequence diagram illustrating communication exchanges for detecting use of wrong IP addresses according to embodiments of the present disclosure.

FIG. 3 shows an exemplary sequence diagram illustrating communication exchanges for causing client devices to renew DHCP IP addresses according to embodiments of the present disclosure. FIG. 3 includes at least a client device 300 and a network controller 310. Network controller 310 further includes at least a data plane and a control plane. Specifically, the data plane includes datapath 320; the control plane includes at least a station management (STM) process 330 and an authentication (AUTH) process 340.

Each process in the data plane and/or control plane corresponds to a unique process identifier. An inter-process communication mechanism exists to allow datapath 320, station management (STM) process 330, and authentication (AUTH) process 340 to communicate with each other using the process identifiers and a pre-specified communication protocol.

At time point $t_0$, client device 300 fails to obtain a valid DHCP IP address, thereby completes a client automatic IP address self-assignment 350. Shortly after, at time point $t_1$, client device 300 transmits a broadcast packet 355, which has the wrong IP address as source IP address. Broadcast packet with wrong IP address 355 is received by datapath 320 at network controller 310 at time point $t_2$. Thus, datapath 320 immediately detects the wrong IP address used in broadcast packet 355. Upon wrong IP address detection 360, datapath 320 will send a de-association message 365 to station management (STM) process 330 in the control plane of network controller 310. After receiving de-association message 365 at time point $t_3$, station management (STM) process 330 will then send a de-association message 372 to client device 300, causing client device 300 to disassociate with the network. De-association message 372 is subsequently received by client device 300 at time point $t_5$.

In addition, upon receiving de-association message 365 from datapath 320, station management (STM) process 330 will also trigger a station down event 370, which is transmitted to an authentication (AUTH) process 340 in the control plane at network controller 310. After receiving station down event 370 at time point $t_4$, authentication (AUTH) process 340 deletes a corresponding user entry for client device 300 in the control path at time point $t_6$. Moreover, authentication (AUTH) process 340 also deletes the corresponding user entry for client device 300 in datapath 320.

When a client device (e.g., client device 300) associates with a particular extended service identifier (ESSID) that a particular access point (AP) has broadcasted, station management (STM) process 330 receives an association message from the client device (e.g., client device 300), and informs authentication (AUTH) process 340 that the client device has joined the particular ESSID. Thereafter, authentication (AUTH) process 340 will create the Layer-2 user entry for the client device (e.g., client device 300) in the control plane.

Moreover, authentication (AUTH) process 340 will perform a basic validity check to ensure that the IP address is valid for the corresponding subnet mask, and then insert a copy of the same user entry to the datapath 320. Any addition, deletion, and/or modification operation of the user entries can be performed exclusively by authentication (AUTH) process 340.

When a particular user entry is deleted in the datapath and the control plane, the corresponding client device (e.g., client device 300) is forced to immediately associate with the same extended service set identifier (ESSID) broadcasted by the same AP that client device 300 was previously connected to. An access point (AP) may broadcast multiple ESSIDs. However, client device 300 will attempt to be connected to the same ESSID after receiving de-association message 372 from station management (STM) process 320. Because the user entry corresponding to client device 300 has been deleted by AUTH process 340 in the datapath 320, datapath 320 will generate a user miss event that triggers AUTO process 340 to restart authentication process for client device 300, for example, by prompting for the user credentials.

Furthermore, if client device 300 fails to connect to the same ESSID, client device 300 will retry the connection to the same ESSID a few times. Client device 300 can be configured with multiple ESSIDs. If client device 300 fails to connect to the same ESSID after a few retries, client device 300 will try to connect to the next configured ESSID. Note that, existing DHCP mechanisms lack effective ways to force client device 300 to re-initiate the DHCP handshake communication exchanges immediately after a failure to obtain DHCP IP address. Here, client device 300 will re-initiate the DHCP handshake communication exchanges after being disassociated with the network and fully de-authenticated by network controller 310.

Thus, as illustrated in FIG. 3, at time point $t_7$, client device 300 will retransmit an association message 380 to the same ESSID. After client device 300 transmit association message 380, client device 300 will request a new DHCP IP address. After station management (STM) process 330 receives the association message 380 from client device 300, at time point $t_8$, station management (STM) process 330 informs authentication (AUTH) process 340 of client identifier 380, e.g., client device 300's Media Access Control (MAC) address. Authentication (AUTH) process 340 receives the notification from station management (STM) process at time point $t_9$. Next, because neither Layer-2 nor Layer-3 user entry corresponding to client device 300 exists in the control plane and/or datapath, authentication (AUTH) process 340 creates user entry in control plane 390 at time point $t_{10}$. Also, authentication (AUTH) process 340 creates a copy of the user entry in datapath 395 at time point $t_{11}$.

In some embodiments, station management (STM) process 330 maintains a hash table that includes the MAC addresses of client devices and the number of times that each client device has been issued a de-association message by network controller 310. If the number of times corresponding to a particular client device exceeds a threshold value, network controller 310 will stop sending de-association message to the particular client device.

Moreover, in some embodiments, network controller 310 may incrementally back off the time interval that it waits before sending out the next de-association message to the same client device. For example, network controller 310 may immediately send the first de-association message 372 to client device 300 after wrong IP detection 360 at datapath 320. If client device 300 fails to obtain a valid DHCP IP address again after retrying association to the same ESSID 380 and re-assigns another automatic IP address to itself, network controller 310 will wait for a short period of time (e.g., 3 seconds) before transmitting the second de-association message to client device 300. If client device 300 still fails to obtain a valid DHCP IP address and self-assigns a third automatic IP address, network controller 310 will exponentially back off, e.g., by waiting for 9 seconds before transmitting the third de-association message to client device 300. Network controller 310 may be configured to send a maximum of three de-association messages. Thus, network controller 310 will stop sending de-association messages to client device 300 after transmitting the third de-association message to client device 300, even if client device 300 still fails to obtain a valid DHCP IP address.

Processes for Detecting Use of Wrong IP Addresses

Figure 4:
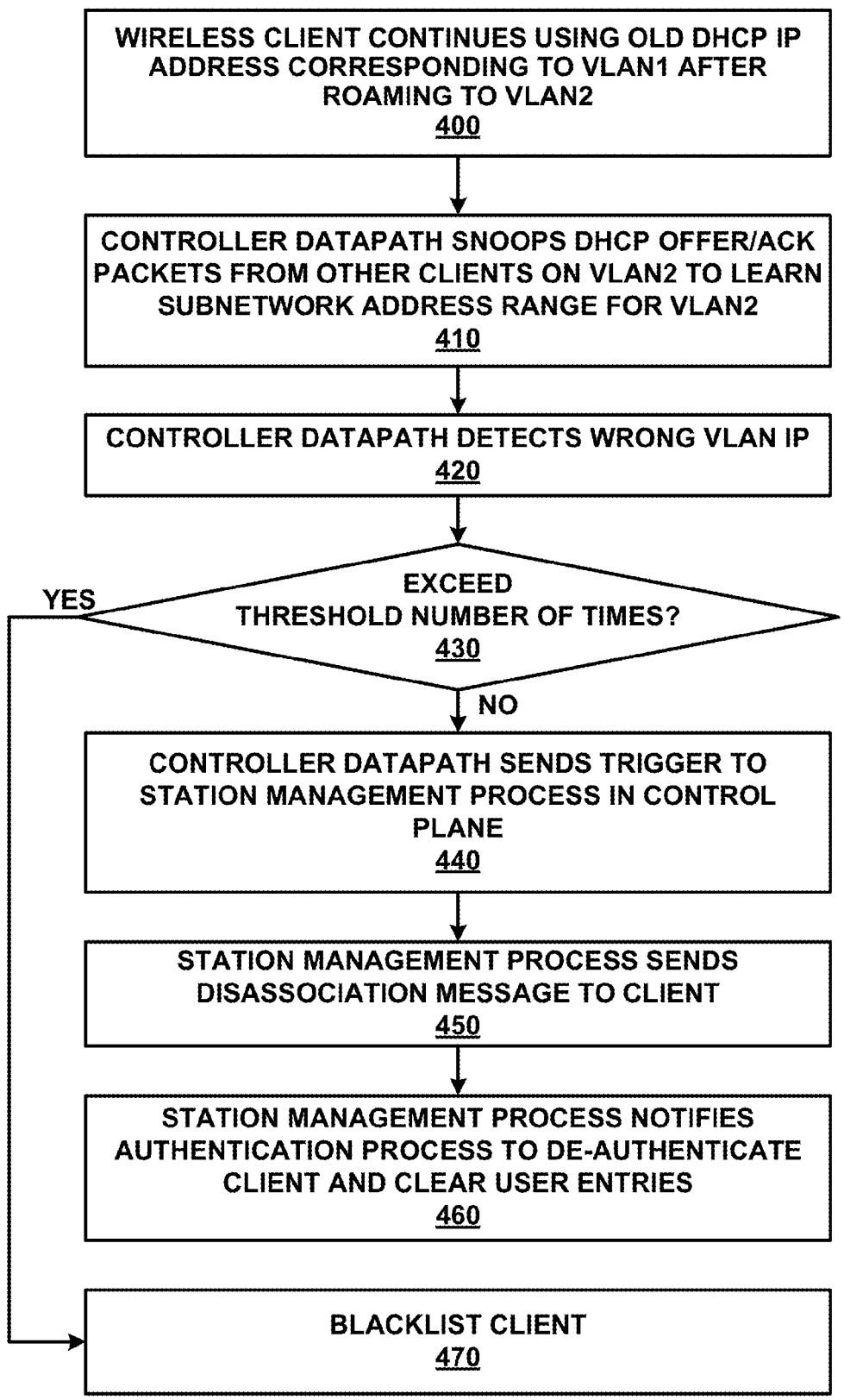
FIG. 4 shows an exemplary process for detecting use of wrong IP addresses according to embodiments of the present disclosure.

FIG. 4 illustrates a detailed exemplary process for detecting use of wrong IP addresses according to embodiments of the present disclosure. During operations, a wireless client device continues using an old DHCP IP address corresponding to $VLAN_1$ after roaming to $VLAN_2$ (operation 400). Also, a network controller's datapath snoops DHCP OFFER packets or DHCP ACK packets from other client devices on $VLAN_2$ to learn the sub-network IP address range for $VLAN_2$ (operation 410). Subsequently, the network controller's datapath may detect a wrong VLAN IP used by the wireless client device (operation 420). Then, the network controller determines whether determines whether the number of times that the network controller sent disassociation message to the client device has exceeded a threshold number of times (operation 430). If so, the network controller will blacklist the client device (operation 470) and stop sending disassociation messages to the client device. Otherwise, the network controller datapath sends a trigger to station management process in the control plane (operation 440). Then, the station management process sends a disassociation message to the client device (operation 450). Moreover, the station management process also notifies an authentication process in the control plane to de-authenticate the client device and clear corresponding user entries in both control plane and datapath (operation 460).

Figure 5:
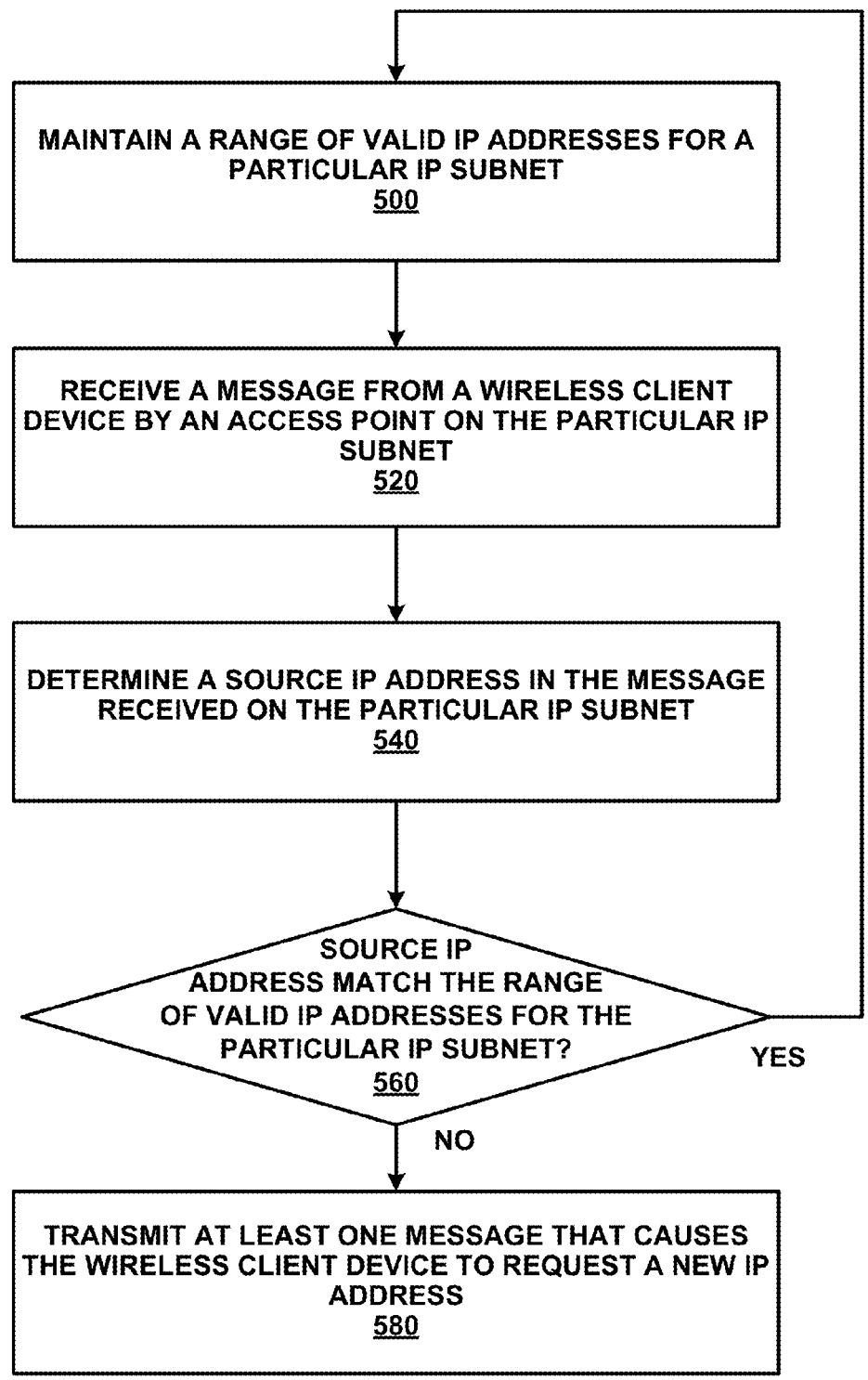
FIG. 5 shows an exemplary process for detecting use of wrong IP addresses according to embodiments of the present disclosure.

FIG. 5 illustrates an exemplary process for detecting use of wrong IP addresses according to embodiments of the present disclosure. During operations, a network device maintains a range of valid IP addresses for a particular IP subnet (operation 500). The network device then receives a message from a first wireless client device by an access point on the particular IP subnet (operation 520). Then network device then determines a source IP address in the message received on the particular IP subnet (operation 540). Further, the network device determines whether the source IP address matches the range of valid IP addresses for the particular IP subnet (operation 560). If so, the network device continues the process and repeats operations 500-560. If, however, the source IP address in the message received on the particular IP subnet does not match the range of valid IP addresses for the particular IP subnet, the network device will transmit at least one message that causes the wireless client device to request a new IP address (operation 580).

In some embodiments, maintaining the range of valid IP addresses involves snooping a DHCP message transmitted to a second wireless client device on the particular IP subnet. Based on the DHCP message, the network device can identify the range of valid IP addresses on the particular IP subnet. In particular, the network can identify the range of valid IP addresses on the particular IP subnet in the DHCP message by: determining a subnet mask, corresponding to the particular IP subnet, indicated in the DHCP message and identifying the range of valid IP addresses on the particular IP subnet based on the subnet mask.

In some embodiments, the network device receives the message from the wireless client device subsequent to the wireless client device being assigned the source IP address while on a second IP subnet and roaming from the second IP subnet to the particular IP subnet.

In some embodiments, the DHCP message is a DHCP acknowledgement. In some embodiments, the DHCP message is a DHCP offer message.

In some embodiments, the range of valid IP addresses for the particular IP subnet is determined by snooping one or more messages on the particular IP subnet.

In some embodiments, the range of valid IP addresses for the particular IP subnet is determined based on a configuration stored at a network device on the particular IP subnet.

In some embodiments, the range of valid IP addresses for the particular IP subnet is determined by snooping a route advertisement message.

In some embodiments, the at least one message that causes the wireless client device to request a new IP address includes a de-association message and a de-authentication message. In some embodiments, the at least one message includes only a de-association message sent to the wireless client device. In some embodiments, the at least one message comprises a De-Authentication message. Note that, the de-authentication message is transmitted to a second network device storing authentication information corresponding to the wireless client device.

System for Detecting Use of Wrong IP Addresses

Figure 6:
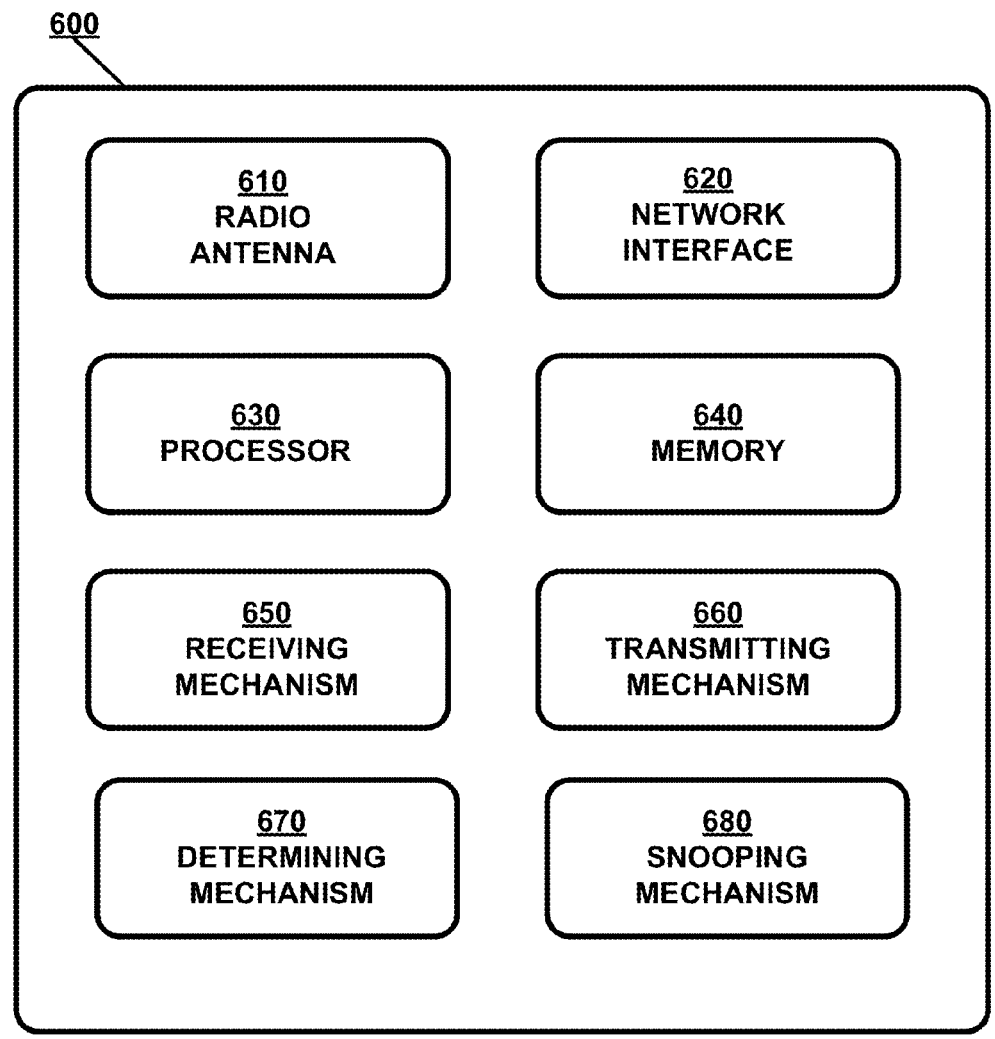
FIG. 6 is a block diagram illustrating an exemplary system for detecting use of wrong IP addresses according to embodiments of the present disclosure.

FIG. 6 is a block diagram illustrating a system for detecting wrong IP addresses according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a determining mechanism 670, and a snooping mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors.

Memory 640 can include storage components, such as, Dynamic Random Access Memory (DRAM), Static Random Access Memory (SRAM), etc. Specifically, memory 640 can maintain a list of wireless client devices that have been caused to request a new IP address.

Receiving mechanism 650 generally receives one or more network messages via network interface 620 or radio antenna 610 from a wireless client device. The received network messages may include, but are not limited to, requests and/or responses, beacon frames, management frames, control path frames, and so on.

Specifically, in some embodiments, receiving mechanism 650 receives a message from a first wireless client device by an access point on the particular IP subnet. The message from the first wireless client device is performed subsequent to the first wireless client device being assigned the source IP address while on a second IP subnet and roaming from the second IP subnet to the particular IP subnet.

Transmitting mechanism 660 generally transmits messages, which include, but are not limited to, requests and/or responses, beacon frames, management frames, control path frames, and so on. Specifically, transmitting mechanism 660 can transmit at least one message that causes the wireless client device to request a new IP address, in response to at least to determining mechanism 670 determining that the source IP address does not match the range of valid IP addresses for the particular IP subnet.

In some embodiments, the at least one message includes both a de-association message and a de-authentication message. In some embodiments, the at least one message includes only a de-association message sent to the wireless client device. In some embodiments, the at least one message includes only a De-Authentication message. Further, the de-authentication message can be transmitted to a second network device storing authentication information corresponding to the wireless client device.

In some embodiments, transmitting mechanism 660 transmits the at least one message that causes the wireless client device to request a new IP address further in response to determining mechanism 670 determining that a number of times the client has been caused to request a new IP address is less than a threshold value.

Determining mechanism 670 generally determines a source IP address in the message received on the particular IP subnet. Moreover, determining mechanism 670 determines whether the source IP address matches the range of valid IP addresses for the particular IP subnet.

Snooping mechanism 680 generally maintains a range of valid IP addresses for a particular IP subnet, for example, by snooping a DHCP message transmitted to a second wireless client device on the particular IP subnet. Based on the DHCP message, snooping mechanism 680 identifies the range of valid IP addresses on the particular IP subnet. Specifically, identifying the range of valid IP addresses on the particular IP subnet in the DHCP message involves determining a subnet mask, corresponding to the particular IP subnet, indicated in the DHCP message and identifying the range of valid IP addresses on the particular IP subnet based on the subnet mask.

Note that, the DHCP message can be a DHCP acknowledgement message and/or a DHCP offer message.

In some embodiments, the range of valid IP addresses for the particular IP subnet may be determined by snooping one or more messages on the particular IP subnet. In some embodiments, the range of valid IP addresses for the particular IP subnet is determined based on a configuration stored at a network device on the particular IP subnet. In some embodiments, the range of valid IP addresses for the particular IP subnet is determined by snooping a route advertisement message in an IPv6 network.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area.

However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a processor, causes the processor to:
   maintain a range of valid IP addresses for a particular IP subnet;
   receive a message from a first wireless client device that uses a source IP address not authenticated for the particular IP subnet within the particular IP subnet by an access point on the particular IP subnet;
   determine a source IP address in the message received on the particular IP subnet;
   determine that the source IP address is not within the range of valid IP addresses for the particular IP subnet;
   responsive at least to determining that the source IP address is not within the range of valid IP addresses for the particular IP subnet, transmit at least one message that causes the first wireless client device to request a new IP address that is within the valid IP addresses.

2. The non-transitory computer readable medium of claim 1, further comprising instructions to:
   snoop a DHCP message transmitted to a second wireless client device on the particular IP subnet; and
   based on the DHCP message, identify the range of valid IP addresses on the particular IP subnet.

3. The non-transitory computer readable medium of claim 2, wherein instructions to identify the range of valid IP addresses on the particular IP subnet in the DHCP message comprise instructions to determine a subnet mask, corresponding to the particular IP subnet, indicated in the DHCP message and identify the range of valid IP addresses on the particular IP subnet based on the subnet mask.

4. The non-transitory computer readable medium of claim 3, wherein instructions to receive the message from the first wireless client device is performed subsequent to the first wireless client device being assigned the source IP address while on a second IP subnet and roaming from the second IP subnet to the particular IP subnet.

5. The non-transitory computer readable medium of claim 2, wherein the DHCP message is a DHCP acknowledgement message.

6. The non-transitory computer readable medium of claim 2, wherein the DHCP message is a DHCP offer message.

7. The non-transitory computer readable medium of claim 1, wherein the range of valid IP addresses for the particular IP subnet is determined by snooping a message on the particular IP subnet.

8. The non-transitory computer readable medium of claim 1, wherein the range of valid IP addresses for the particular IP subnet is determined based on configuration stored at a network device on the particular IP subnet.

9. The non-transitory computer readable medium of claim 1, wherein the range of valid IP addresses for the particular IP subnet is determined by snooping a route advertisement message.

10. The non-transitory computer readable medium of claim 1, wherein the at least one message comprises a De-Association message and a De-Authentication message.

11. The non-transitory computer readable medium of claim 1, wherein the at least one message comprises a De-Association message sent to the wireless client device.

12. The non-transitory computer readable medium of claim 1, wherein the at least one message comprises a De-Authentication message.

13. The non-transitory computer readable medium of claim 12, wherein the de-authentication message is transmitted to a second network device storing authentication information corresponding to the wireless client device.

14. A system comprising:
   at least one device including a hardware processor;
   the system to perform operations comprising:
      maintaining a range of valid IP addresses for a particular IP subnet;
      receiving a message from a first wireless client device by an access point on the particular IP subnet;
      determining a source IP address in the message received on the particular IP subnet;
      determining that the source IP address is not within the range of valid IP addresses for the particular IP subnet without modifying the source IP address prior to determining that the source IP address is not within the range of valid IP addresses; and
      responsive at least to determining that the source IP address is not within the range of valid IP addresses for the particular IP subnet, transmitting at least one message that causes the first wireless client device to request a new IP address that is within the valid IP addresses.

15. The system of claim 14, wherein to maintain the range of valid IP addresses comprises:
   to snoop a DHCP message transmitted to a second wireless client device on the particular IP subnet; and
   based on the DHCP message, to identify the range of valid IP addresses on the particular IP subnet.

16. The system of claim 15, wherein to identify the range of valid IP addresses on the particular IP subnet in the DHCP message comprises to determine a subnet mask, corresponding to the particular IP subnet, indicated in the DHCP message and identifying the range of valid IP addresses on the particular IP subnet based on the subnet mask.

17. The system of claim 16, wherein the message from the first wireless client device is received subsequent to the first wireless client device being assigned the source IP address while on a second IP subnet and roaming from the second IP subnet to the particular IP subnet.

18. The system of claim 15, wherein the DHCP message comprises one of a DHCP acknowledgement message and a DHCP offer message.

19. The system of claim 14, wherein the range of valid IP addresses for the particular IP subnet is determined either (a) by snooping a message on the particular IP subnet, or (b) by snooping a route advertisement message, or (c) based on a configuration stored at a network device on the particular IP subnet.

20. The system of claim 14, wherein the at least one message comprises a De-Association message and/or a De-Authentication message.

* * * * *